(12) United States Patent
Kwon et al.

(10) Patent No.: US 11,136,506 B2
(45) Date of Patent: *Oct. 5, 2021

(54) COPOLYMER FOR LIQUID CRYSTAL ALIGNMENT AGENT, LIQUID CRYSTAL ALIGNMENT AGENT INCLUDING THE SAME, AND LIQUID CRYSTAL ALIGNMENT FILM AND LIQUID CRYSTAL DISPLAY DEVICE USING THE SAME

(71) Applicant: LG CHEM, LTD., Seoul (KR)

(72) Inventors: Soon Ho Kwon, Daejeon (KR); Jung Ho Jo, Daejeon (KR); Sung Joon Min, Daejeon (KR); Hang Ah Park, Daejeon (KR); Jun Young Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/619,679

(22) PCT Filed: Sep. 20, 2018

(86) PCT No.: PCT/KR2018/011171
§ 371 (c)(1),
(2) Date: Dec. 5, 2019

(87) PCT Pub. No.: WO2019/066394
PCT Pub. Date: Apr. 4, 2019

(65) Prior Publication Data
US 2020/0165521 A1 May 28, 2020

(30) Foreign Application Priority Data

Sep. 29, 2017 (KR) .................. 10-2017-0128185

(51) Int. Cl.
| | | |
|---|---|---|
| *C09K 19/56* | (2006.01) | |
| *C08G 73/10* | (2006.01) | |
| *G02F 1/1337* | (2006.01) | |
| *C09K 19/34* | (2006.01) | |
| *C09K 19/06* | (2006.01) | |
| *C09K 19/38* | (2006.01) | |

(52) U.S. Cl.
CPC .......... *C09K 19/56* (2013.01); *C08G 73/1046* (2013.01); *C08G 73/1075* (2013.01); *C08G 73/1078* (2013.01); *C09K 19/067* (2013.01); *C09K 19/345* (2013.01); *G02F 1/133723* (2013.01); *G02F 1/133788* (2013.01); *C09K 19/3441* (2013.01); *C09K 19/3444* (2013.01); *C09K 19/3475* (2013.01); *C09K 19/3477* (2013.01); *C09K 19/3823* (2013.01); *C09K 19/3828* (2013.01); *C09K 2219/03* (2013.01); *C09K 2323/02* (2020.08); *C09K 2323/027* (2020.08)

(58) Field of Classification Search
CPC .. C09K 19/56; C09K 19/067; C09K 19/3823; C09K 19/3828; C09K 19/3441; C09K 19/3444; C09K 19/345; C09K 19/3475; C09K 19/3477; C09K 2219/03; C09K 2323/02; C08G 73/1046; C08G 73/1075; C08G 73/1078; C08G 73/1042; C08G 73/1057; C08G 73/1064; C08G 73/1085
See application file for complete search history.

(56) References Cited

U.S. PATENT DOCUMENTS

| | | | | |
|---|---|---|---|---|
| 5,773,559 | A | * | 6/1998 | Miyamoto ......... C08G 73/1042 528/353 |
| 6,001,277 | A | * | 12/1999 | Ichimura ........... G02F 1/133788 252/299.4 |
| 8,829,153 | B2 | * | 9/2014 | Sakumoto ............. C08K 5/0025 528/353 |
| 9,758,622 | B2 | * | 9/2017 | Jeon ................... C08G 73/1078 |
| 10,202,491 | B2 | * | 2/2019 | Kang ................ G02F 1/133788 |
| 2004/0039150 | A1 | * | 2/2004 | Shin ....................... C09K 19/56 528/170 |
| 2012/0172541 | A1 | | 7/2012 | Dong et al. |
| 2015/0045481 | A1 | | 2/2015 | Kim et al. |
| 2015/0085237 | A1 | * | 3/2015 | Kang ................ G02F 1/133788 349/127 |
| 2016/0070142 | A1 | * | 3/2016 | Kang ..................... C08L 77/00 349/43 |
| 2016/0109759 | A1 | * | 4/2016 | Kang ..................... C09K 19/56 349/43 |

(Continued)

FOREIGN PATENT DOCUMENTS

| | | |
|---|---|---|
| CN | 107089956 A | 8/2017 |
| JP | H03-121132 A | 5/1991 |

(Continued)

OTHER PUBLICATIONS

International Search Report and Written Opinion issued for PCT application No. PCT/KR2018/011171 dated Jan. 11, 2019, 10 pages.
Guan, et al., "Highly refractive polyimides containing pyridine and sulfur units: synthesis and thermal, mechanical, solubility and optical properties", Polymer International, 2017, vol. 66, pp. 1044-1054 & 1048-1051.

*Primary Examiner* — Jane L Stanley

(74) *Attorney, Agent, or Firm* — Rothwell, Figg, Ernst & Manbeck, P.C.

(57) ABSTRACT

A polymer having excellent liquid crystal alignment and electrical properties and thus is suitable for use as a liquid crystal alignment agent, a liquid crystal alignment agent including the same, a liquid crystal alignment film formed from the liquid crystal alignment agent, and a liquid crystal display device including the liquid crystal alignment film are provided.

17 Claims, No Drawings

(56) References Cited

U.S. PATENT DOCUMENTS

| | | | | |
|---|---|---|---|---|
| 2016/0195777 A1* | 7/2016 | Lee | .................... | C08G 73/1078 |
| | | | | 349/43 |
| 2016/0229958 A1* | 8/2016 | Jeon | .................... | C08G 73/101 |
| 2017/0066969 A1 | 3/2017 | Tsai | | |
| 2017/0283702 A1* | 10/2017 | Kang | .................... | C09D 179/08 |
| 2018/0230384 A1 | 8/2018 | Jo et al. | | |
| 2019/0391420 A1* | 12/2019 | Murakami | ............ | G02F 1/1337 |

FOREIGN PATENT DOCUMENTS

| | | | |
|---|---|---|---|
| JP | 2009-067935 A | | 4/2009 |
| JP | 2011-018023 A | | 1/2011 |
| JP | 2015-176110 A | | 10/2015 |
| JP | 2017-161602 A | | 9/2017 |
| KR | 10-2009-0058994 A | | 6/2009 |
| KR | 10-2012-0077467 A | | 7/2012 |
| KR | 10-2013-0103023 A | | 9/2013 |
| KR | 10-2015-0108742 A | | 9/2015 |
| KR | 20150108742 A | * | 9/2015 |
| KR | 10-2016-0142614 A | | 12/2016 |
| KR | 10-2017-0055418 A | | 5/2017 |
| TW | 201537271 A | | 10/2015 |
| TW | 201710385 A | | 3/2017 |
| TW | 201720873 A | | 6/2017 |
| WO | 2017-057854 A1 | | 4/2017 |

* cited by examiner

COPOLYMER FOR LIQUID CRYSTAL ALIGNMENT AGENT, LIQUID CRYSTAL ALIGNMENT AGENT INCLUDING THE SAME, AND LIQUID CRYSTAL ALIGNMENT FILM AND LIQUID CRYSTAL DISPLAY DEVICE USING THE SAME

CROSS-REFERENCE TO RELATED APPLICATION

This application is a 35 U.S.C. 371 National Phase Entry Application from PCT/KR2018/011171, filed Sep. 20, 2018, which claims the benefit of priority from Korean Patent Application No. 10-2017-0128185 filed on Sep. 29, 2017 with the Korean Intellectual Property Office, the disclosures of which are incorporated herein by reference in their entirety.

TECHNICAL FIELD

The present invention relates to a copolymer having excellent liquid crystal alignment and electrical properties and thus is suitable for use as a liquid crystal alignment agent, a liquid crystal alignment agent including the same, a liquid crystal alignment film formed from the liquid crystal alignment agent, and a liquid crystal display device including the liquid crystal alignment film.

BACKGROUND ART

In order to obtain uniform brightness and a high contrast ratio in a liquid crystal display device, it is essential for the liquid crystals to be uniformly aligned. The liquid crystal alignment agent serves as a director in the arrangement of liquid crystal molecules, and thus, when the liquid crystals move by an electric field to form an image, it helps them take an appropriate direction.

Polyimide, polyamide, polyester, and the like are widely known as conventional liquid crystal alignment agents. Among them, particularly, polyimide is excellent in heat resistance, affinity with liquid crystal, mechanical strength, etc., and therefore is used for many liquid crystal display devices.

However, in recent years, as the demand for a lower power display has increased, it has been found that the liquid crystal alignment agent can affect not only the basic properties such as the alignment property of the liquid crystal but also the electrical properties such as an afterimage generated by a direct current/alternating voltage, and a voltage holding ratio. Thus, there is a growing need for the development of a liquid crystal alignment material capable of simultaneously realizing excellent liquid crystal alignment and electrical properties.

For this purpose, various attempts have been made to change the structure itself of the liquid crystal alignment agent, through a method of changing monomers used for the production of the liquid crystal alignment agent or by combining a plurality of different monomers, thereby improving the physical/chemical properties thereof. However, these attempts have not yet reached a dramatic improvement in physical properties.

Therefore, there is a need to develop a novel liquid crystal alignment agent having excellent liquid crystal alignment and electrical properties.

DETAILED DESCRIPTION OF THE INVENTION

Technical Problem

An object of the present invention is to provide a copolymer having excellent liquid crystal alignment and electrical properties and thus is suitable for use as a liquid crystal alignment agent.

Another object of the present invention is to provide a liquid crystal alignment agent, a liquid crystal alignment film, and a liquid crystal display device using the above-described copolymer for a liquid crystal alignment agent.

Technical Solution

The present invention provides a copolymer for a liquid crystal alignment agent including one or more repeating units selected from the group consisting of a repeating unit represented by the following Chemical Formula 1, a repeating unit represented by the following Chemical Formula 2, and a repeating unit represented by the following Chemical Formula 3; and one or more repeating units selected from the group consisting of a repeating unit represented by the following Chemical Formula 4, a repeating unit represented by the following Chemical Formula 5, and a repeating unit represented by the following Chemical Formula 6:

[Chemical Formula 1]

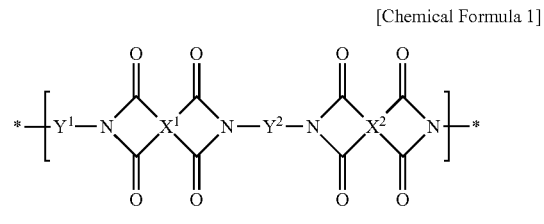

[Chemical Formula 2]

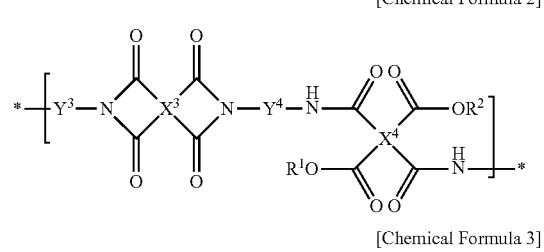

[Chemical Formula 3]

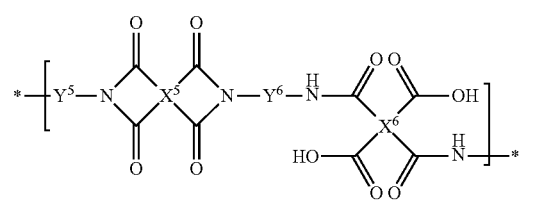

[Chemical Formula 4]

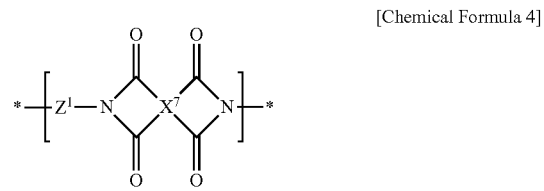

-continued

[Chemical Formula 5]

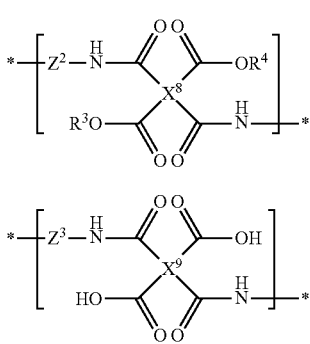

[Chemical Formula 6]

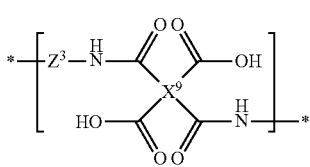

wherein, in Chemical Formulae 1 to 6,
$R^1$, $R^2$, $R^3$, and $R^4$ are each independently hydrogen or a $C_{1-10}$ alkyl, provided that $R^1$ and $R^2$ are not both hydrogen, and $R^3$ and $R^4$ are not both hydrogen,
$X^1$, $X^3$, and $X^5$ are each independently a tetravalent organic group represented by the following Chemical Formula 7:

[Chemical Formula 7]

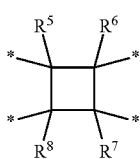

wherein, in Chemical Formula 7,
$R^5$, $R^6$, $R^7$, and $R^8$ are each independently hydrogen or a $C_{1-6}$ alkyl,
$X^2$, $X^4$, $X^6$, $X^7$, $X^8$, and $X^9$ are each independently a tetravalent organic group derived from a hydrocarbon having 4 to 20 carbon atoms or a tetravalent organic group, wherein in the tetravalent organic group, one or more of H is substituted with a halogen or one or more of —$CH_2$— is substituted with —O—, —CO—, —S—, —SO—, —$SO_2$—, or —CONH— to prevent direct binding with oxygen or sulfur atoms,
in Chemical Formulae 1 to 3,
$Y^1$, $Y^2$, $Y^3$, $Y^4$, $Y^5$, and $Y^6$ are each independently a divalent organic group represented by the following Chemical Formula 8:

[Chemical Formula 8]

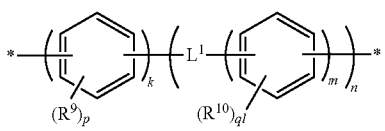

wherein, in Chemical Formula 8,
$R^9$ and $R^{10}$ are each independently a halogen, a cyano, a $C_{1-10}$ alkyl, a $C_{2-10}$ alkenyl, a $C_{1-10}$ alkoxy, a $C_{1-10}$ fluoroalkyl, or a $C_{1-10}$ fluoroalkoxy,
p and q are each independently an integer of 0 to 4,
$L^1$ is a single bond, —O—, —CO—, —S—, —$SO_2$—, —$C(CH_3)_2$—, —$C(CF_3)_2$—, —CONH—, —COO—, —$(CH_2)_z$—, —$O(CH_2)_zO$—, —$O(CH_2)_z$—, —$OCH_2$—$C(CH_3)_2$—$CH_2O$—, —COO—$(CH_2)_z$—OCO—, or —OCO—$(CH_2)_z$—COO—, wherein each z is independently an integer of 1 to 10,
k and m are each independently an integer of 0 to 3, and n is an integer of 0 to 3,
in Chemical Formulae 4 to 6,
$Z^1$, $Z^2$, and $Z^3$ are each independently a divalent organic group represented by the following Chemical Formula 9:

[Chemical Formula 9]

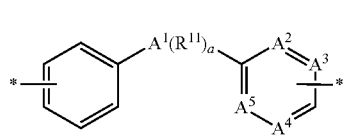

wherein, in Chemical Formula 9,
$A^1$ is an element of Group 16,
$R^{11}$ is hydrogen or a $C_{1-10}$ alkyl,
a is an integer of 0 to 3, and
$A^2$, $A^3$, $A^4$, and $A^5$ are nitrogen or carbon, provided that at least one of $A^2$ to $A^5$ is nitrogen and the rest are carbon.

Hereinafter, a copolymer for a liquid crystal alignment agent according to a specific embodiment of the present invention, a preparation method thereof, a liquid crystal alignment agent including the copolymer, a method of producing a liquid crystal alignment film using the liquid crystal alignment agent, and a liquid crystal display device including the liquid crystal alignment film thus produced will be described in more detail.

Throughout the specification, when one part "includes" one constituent element, unless otherwise specifically described, this does not mean that another constituent element is excluded, but means that another constituent element may be further included.

As used herein, the term "substituted" means that a hydrogen atom in a compound is changed to another substituent, and a position to be substituted is not limited as long as the position is one at which the hydrogen atom is substituted, that is, a position at which the substituent may be substituted, and when two or more are substituted, the two or more substituents may be the same as or different from each other.

As used herein, the term "substituted or unsubstituted" means that substitution is performed by one or more substituent groups selected from the group consisting of deuterium; a halogen group; a cyano group; a nitro group; a hydroxyl group; a carbonyl group; an ester group; an imide group; an amide group; an amino group; a carboxy group; a sulfonic acid group; a sulfonamide group; a phosphine oxide group; an alkoxy group; an aryloxy group; an alkylthioxy group; an arylthioxy group; an alkylsulfoxy group; an arylsulfoxy group; a silyl group; a boron group; an alkyl group; a cycloalkyl group; an alkenyl group; an aryl group; an aralkyl group; an aralkenyl group; an alkylaryl group; an arylphosphine group, or a heterocyclic group containing at least one of N, O, and S atoms, or there is no substituent group, or substitution is performed by a substituent group where two or more substituent groups of the exemplified substituent groups are linked, or there is no substituent group. For example, the term "substituent group where two or more substituent groups are linked" may refer to a biphenyl group. That is, the biphenyl group may be an aryl group, or may be interpreted as a substituent group where two phenyl groups are connected.

In the present specification,

or ———* means a bond connected to another substituent group, and a direct bond means a case where another atom does not exist in a portion represented by L.

In the present specification, the alkyl group may be straight-chained or branched, and the number of carbon atoms thereof is not particularly limited, but is preferably 1 to 10. According to another embodiment, the alkyl group has 1 to 6 carbon atoms. Specific examples of the alkyl group include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cycloheptylmethyl, octyl, n-octyl, tert-octyl, 1-methylheptyl, 2-ethylhexyl, 2-propylpentyl, n-nonyl, 2,2-dimethylheptyl, 1-ethylpropyl, 1,1-dimethyl-propyl, isohexyl, 2-methylpentyl, 4-methylhexyl, 5-methylhexyl, and the like, but are not limited thereto.

The fluoroalkyl group having 1 to 10 carbon atoms may be one in which at least one hydrogen atom in an alkyl group having 1 to 10 carbon atoms is substituted with fluorine, and the fluoroalkoxy group having 1 to 10 carbon atoms may be one in which at least one hydrogen atom in an alkoxy group having 1 to 10 carbon atoms is substituted with fluorine.

The halogen may be fluorine (F), chlorine (Cl), bromine (Br), or iodine (I).

The element of Group 16 may be oxygen (O), sulfur (S), selenium (Se), tellurium (Te), or polonium (Po).

The nitrogen oxide is a compound in which a nitrogen atom and an oxygen atom are bonded, and the nitrogen oxide functional group means a functional group containing a nitrogen oxide in the functional group. Examples of the nitrogen oxide functional group include a nitro group ($-NO_2$) and the like.

A copolymer for a liquid crystal alignment agent according to the present invention is characterized by including at least one of the repeating units of Chemical Formulae 1 to 3 prepared from a reaction product containing an imide-containing diamine compound having a specific structure along with at least one of the repeating units of Chemical Formulae 4 to 6 prepared from a reaction product containing a diamine compound having a specific structure that is asymmetric with respect to the center point or the center line.

When polyimide is conventionally used as a liquid crystal alignment film, a polyimide precursor, polyamic acid, or polyamic acid ester having excellent solubility is coated and dried to form a coating film, and then converted to polyimide through a high-temperature heat treatment process, which is then subjected to light irradiation for alignment treatment. However, a lot of light irradiation energy is required to obtain sufficient liquid crystal alignment by light irradiation of the polyimide film, and an additional heat treatment process is also required to secure alignment stability after light irradiation. Use of a lot of light irradiation energy and additional high-temperature heat treatment process are very disadvantageous in terms of process cost and time, and therefore there is a limitation in applying it to practical mass-production process.

Accordingly, the present inventors found that when at least one of the repeating units of Chemical Formulae 1 to 3 prepared from a reaction product containing an imide-containing diamine compound having a specific structure are included in the copolymer for a liquid crystal alignment agent, imide repeating units that has been already imidized are present, and thus anisotropy is directly generated by light irradiation without the high-temperature heat treatment process after formation of the coating film, and subsequently, heat treatment is performed to complete an alignment film. Accordingly, light irradiation energy may be greatly reduced, and a liquid crystal alignment film having an enhanced alignment property and stability may be produced even by a simple process including a single heat treatment process.

Further, the present inventors found that when at least one of the repeating units of Chemical Formulae 4 to 6 prepared from a reaction product containing a diamine compound having a specific structure that is asymmetric with respect to the center point or the center line, along with at least one of the repeating units of Chemical Formulae 1 to 3, are included in the copolymer for a liquid crystal alignment agent, a liquid crystal alignment film produced from the copolymer may have a high voltage holding ratio even at a high temperature, and a reduction in contrast ratio or an afterimage phenomenon may be improved, and alignment stability due to heat stress and mechanical strength of the alignment film may be improved, thereby completing the present invention.

According to one embodiment of the present invention, provided is a copolymer for a liquid crystal alignment agent including one or more repeating units selected from the group consisting of the repeating unit represented by Chemical Formula 1, the repeating unit represented by Chemical Formula 2, and the repeating unit represented by Chemical Formula 3; and one or more repeating units selected from the group consisting of the repeating unit represented by Chemical Formula 4, the repeating unit represented by Chemical Formula 5, and the repeating unit represented by Chemical Formula 6.

The copolymer for a liquid crystal alignment agent may include a block copolymer, a random copolymer, an alternating copolymer, a graft copolymer, or the like.

Specifically, the polymer according to one embodiment may include the repeating units of Chemical Formulae 1 to 6 wherein $X^1$, $X^3$, and $X^5$ are each independently a tetravalent organic group represented by Chemical Formula 7, $X^2$, $X^4$, $X^6$, $X^7$, $X^8$, and $X^9$ are each independently a tetravalent organic group derived from a hydrocarbon having 4 to 20 carbon atoms or a tetravalent organic group, wherein in the tetravalent organic group, one or more of H is substituted with halogen or one or more of $-CH_2-$ is substituted with $-O-$, $-CO-$, $-S-$, $-SO-$, $-SO_2-$, or $-CONH-$ to prevent direct binding with oxygen or sulfur atoms.

For example, $X^2$, $X^4$, $X^6$, $X^7$, $X^8$, and $X^9$ may each independently be a tetravalent organic group represented by the following Chemical Formula 10:

[Chemical Formula 10]

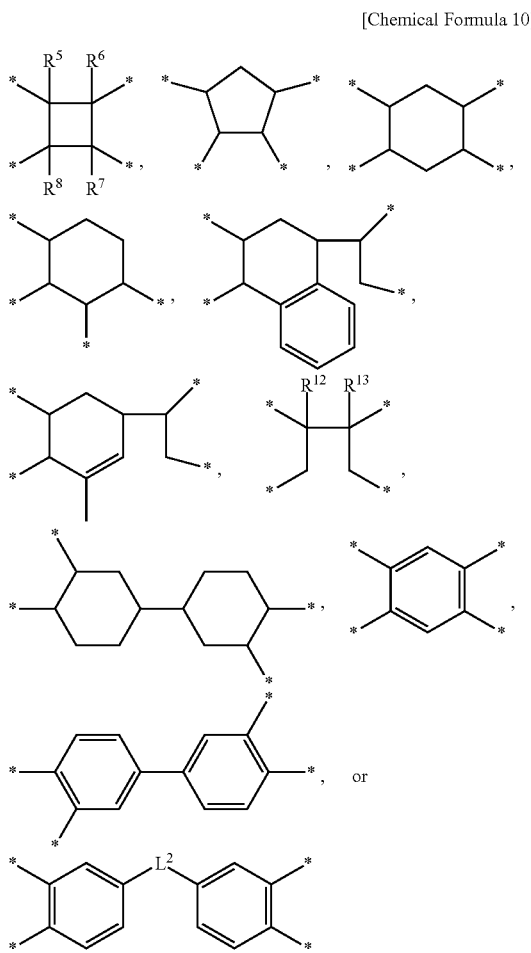

[Chemical Formula 11]

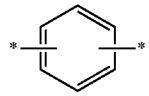

[Chemical Formula 12]

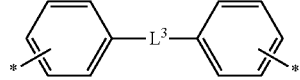

wherein, in Chemical Formula 12, $L^3$ is a single bond, —O—, —SO$_2$—, or —CR$^{16}$R$^{17}$—, wherein $R^{16}$ and $R^{17}$ are each independently hydrogen or a $C_{1-10}$ alkyl.

Preferably, Chemical Formula 11 may be the following Chemical Formula 11-1:

[Chemical Formula 11-1]

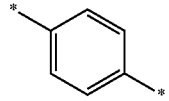

Further, the Chemical Formula 12 may be the following Chemical Formula 12-1:

[Chemical Formula 12-1]

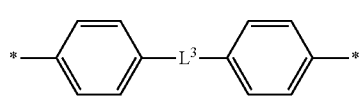

wherein, in Chemical Formula 12-1, $L^3$ is O or CH$_2$.

wherein, in Chemical Formula 10, $R^5$, $R^6$, $R^7$, and $R^8$ are each independently hydrogen or a $C_{1-6}$ alkyl, $R^{12}$ and $R^{13}$ are each independently hydrogen or a $C_{1-10}$ alkyl, and $L^2$ is any one selected from the group consisting of a single bond, —O—, —CO—, —S—, —SO—, —SO$_2$—, —CR$^{14}$R$^{15}$—, —CONH—, —COO—, —(CH$_2$)$_b$—, —O(CH$_2$)$_b$O—, —COO—(CH$_2$)$_b$—OCO—, —HN—(CH$_2$)$_b$—NH—, —R$^{14}$N—(CH$_2$)$_b$—NR$^{15}$—, phenylene, and combinations thereof, wherein $R^{14}$ and $R^{15}$ are each independently hydrogen, a $C_{1-10}$ alkyl, or a $C_{1-10}$ fluoroalkyl, and each b is independently an integer of 1 to 10.

Further, the polymer according to one embodiment may include the repeating units of Chemical Formulae 1 to 3, wherein $Y^1$, $Y^2$, $Y^3$, $Y^4$, $Y^5$, and $Y^6$ may each independently be a divalent organic group represented by Chemical Formula 8.

In Chemical Formula 8, hydrogen is bound to a carbon which is not substituted with $R^9$ or $R^{10}$, and when p or q is an integer of 2 to 4, a plurality of $R^9$ or $R^{10}$ may be the same or different substituents. Further, in Chemical Formula 8, k and m may each independently be an integer of 0 to 3, or 1 to 3, and n may be an integer of 0 to 3, or 0 or 1.

Chemical Formula 8 corresponds to a part of the repeating unit derived from the imide-containing diamine having a specific structure which is a precursor used in the formation of the copolymer for a liquid crystal alignment agent.

More specifically, Chemical Formula 8 may be the following Chemical Formula 11 or Chemical Formula 12:

Further, the polymer according to one embodiment may have repeating units of Chemical Formulae 4 to 6, wherein $Z^1$, $Z^2$, and $Z^3$ may each independently be a divalent organic group represented by Chemical Formula 9. The $Z^1$, $Z^2$, and $Z^3$ may be defined as the divalent organic group represented by Chemical Formula 9 to provide a copolymer for a liquid crystal alignment agent having various structures, which may exhibit the above-descried effects.

In Chemical Formula 9, $A^1$ may be an element of Group 16, and the element of Groups 16 may be oxygen (O), sulfur (S), selenium (Se), tellurium (Te), or polonium (Po). The $R^{11}$ is a functional group binding to $A^1$, and may bind to the $A^1$ element by a number represented by a. Preferably, in Chemical Formula 9, $A^1$ may be oxygen, and a may be an ether functional group of 0.

On the other hand, by satisfying the condition that in Chemical Formula 9 at least one of $A^2$ to $A^5$ is nitrogen and the rest are carbon, Chemical Formula 9 may form an asymmetric structure which does not form symmetry with respect to the center point or the center line due to the nitrogen atom. Chemical Formula 9 is a repeating unit derived from a diamine compound having a specific structure that is asymmetric with respect to the center point or the center line, which is a precursor used for the formation of a copolymer for a liquid crystal alignment agent, and this is considered to be due to the use of an asymmetric diamine as described later.

The functional group represented by Chemical Formula 9 has a structural feature in which two aromatic cyclic compounds, preferably a heteroaromatic cyclic compound and an aromatic cyclic compound, are bound via an ether group. Therefore, the liquid crystal alignment agent may satisfy an equivalent level or more of alignment property or afterimage property, and may have an improved voltage holding ratio, thereby realizing excellent electrical properties.

On the other hand, the functional group represented by Chemical Formula 9 is characterized in that only the amine group, ether group, and hydrogen are bound to each of two aromatic cyclic compounds, preferably the heteroaromatic cyclic compound and the aromatic cyclic compound, and other substituents are not introduced. When a substituent such as a fluoroalkyl group is introduced into the heteroaromatic cyclic compound or the aromatic cyclic compound, there is a technical problem that the alignment property deteriorates due to the substituent.

More specifically, in Chemical Formula 9, one of $A^2$ to $A^5$ may be nitrogen and the rest may be carbon. In Chemical Formula 4, one of $A^2$ and $A^5$ is nitrogen and the rest are carbon, and $A^3$ and $A^4$ may be carbon. That is, the aromatic ring containing $A^2$ to $A^5$ in Chemical Formula 9 may have a pyridine structure. Accordingly, the liquid crystal display device to which the copolymer for a liquid crystal alignment agent of one embodiment is applied may realize a high voltage holding ratio and liquid crystal alignment property.

Further, Chemical Formula 9 may include one or more repeating units selected from the group consisting of the following Chemical Formula 9-1, Chemical Formula 9-2, and Chemical Formula 9-3:

[Chemical Formula 9-1]

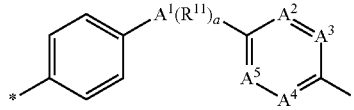

[Chemical Formula 9-2]

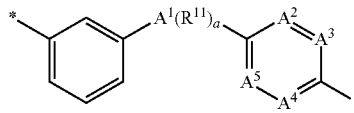

[Chemical Formula 9-3]

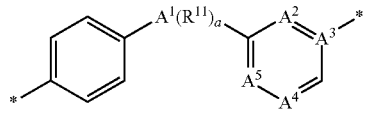

wherein, in Chemical Formula 9-1, Chemical Formula 9-2, and Chemical Formula 9-3, descriptions of $A^1$, $A^2$, $A^3$, $A^4$, $A^5$, $R^{11}$, and a include the above description of Chemical Formula 9.

As described above, as the repeating unit of Chemical Formula 9 includes one or more repeating units selected from the group consisting of Chemical Formula 9-1, Chemical Formula 9-2, and Chemical Formula 9-3, an excellent liquid crystal alignment property may be realized.

On the other hand, in the field of copolymers for liquid crystal alignment agents conventionally known in the art, from the viewpoint of not recognizing the constitution of the asymmetric diamine or the repeating unit derived therefrom, along with the above-described imide-containing diamine having the specific structure, and effects resulting therefrom at all, the copolymer including the repeating units of Chemical Formula 1 to 3 and the repeating units of Chemical Formulae 4 to 6 is considered to be novel. Accordingly, an excellent coating property may be exhibited, thereby providing a copolymer for a liquid crystal alignment agent which may implement a high imidization rate while having excellent processing properties, and may have excellent electrical properties such as an afterimage generated by the direct current/alternating voltage, and the voltage holding ratio.

In particular, the copolymer for a liquid crystal alignment agent of one embodiment may include one or more repeating units selected from the group consisting of repeating units represented by the following Chemical Formulae 13 to 21:

[Chemical Formula 13]

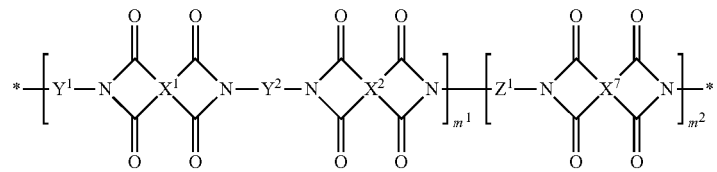

[Chemical Formula 14]

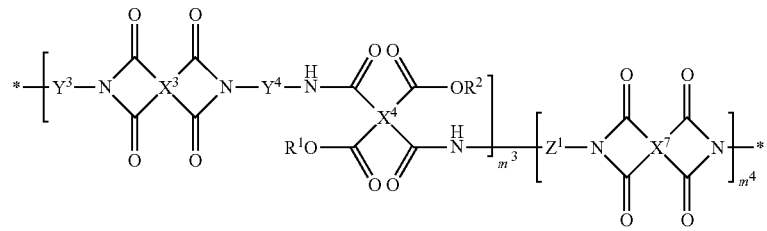

-continued
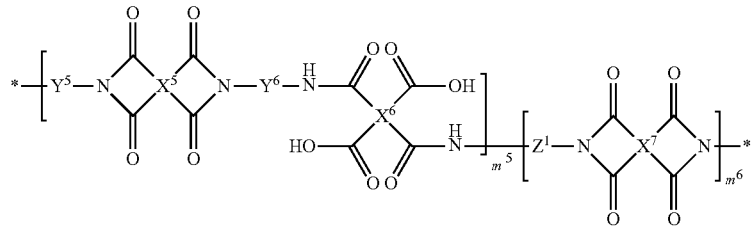
[Chemical Formula 15]
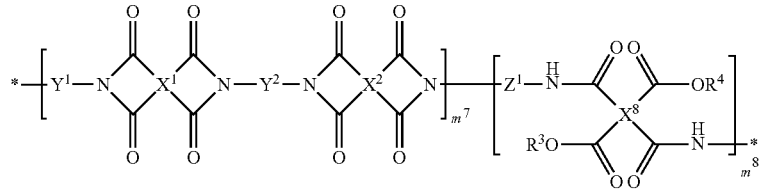
[Chemical Formula 16]
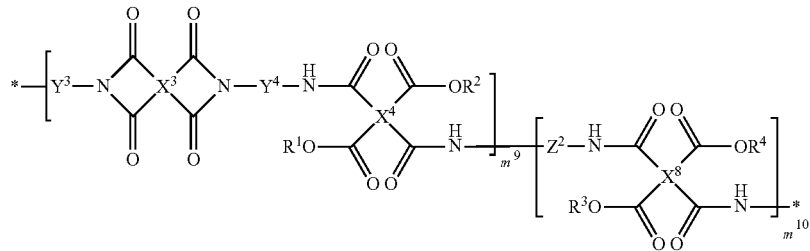
[Chemical Formula 17]
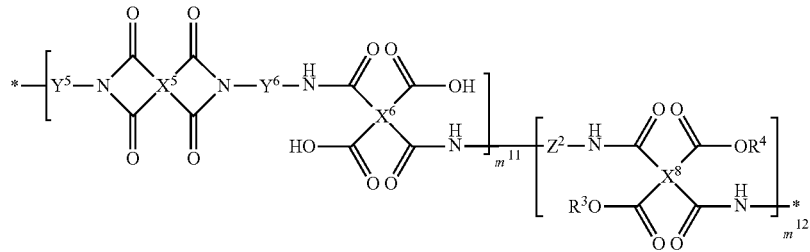
[Chemical Formula 18]
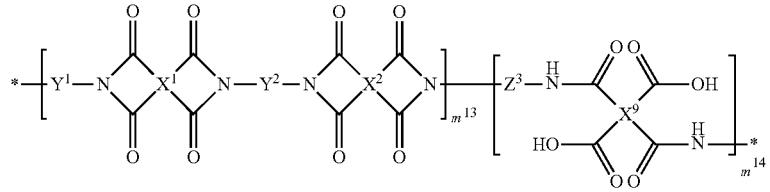
[Chemical Formula 19]
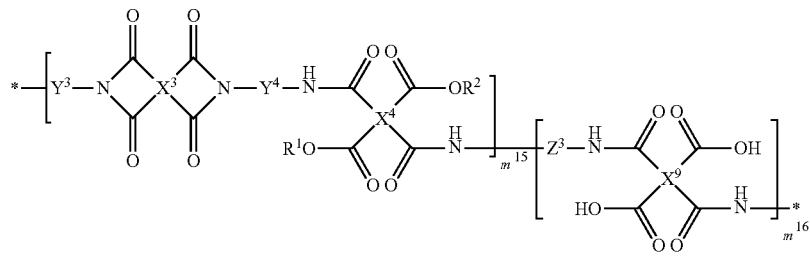
[Chemical Formula 20]

-continued

[Chemical Formula 21]

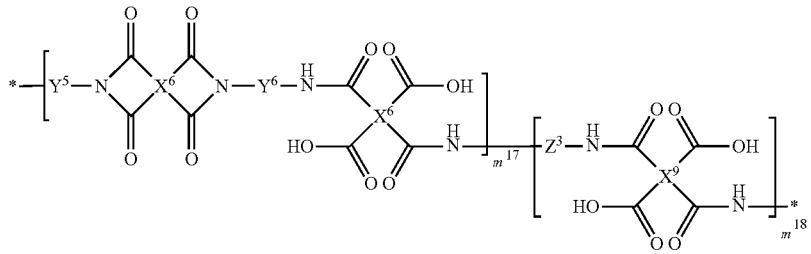

wherein, in Chemical Formulae 13 to 21, descriptions of $R^1$ to $R^4$, $X^1$ to $X^9$, $Y^1$ to $Y^6$, and $Z^1$ to $Z^3$ include the above descriptions of Chemical Formulae 1 to 6. Further, each of $m^1$ to $m^{18}$ is a number of the corresponding repeating units, and each is independently an integer of 1 to 500. In this regard, each of $m^1$ to $m^{18}$ may be adjusted according to a composition ratio of the two kinds of diamine compounds, that is, mol % of the imide-containing diamine having the specific structure and the asymmetric diamine.

In this regard, a molar ratio between repeating units represented by one or more repeating unit selected from the group consisting of the repeating unit represented by Chemical Formula 1, the repeating unit represented by Chemical Formula 2, and the repeating unit represented by Chemical Formula 3, and one or more repeating unit selected from the group consisting of the repeating unit represented by Chemical Formula 4, the repeating unit represented by Chemical Formula 5, and the repeating unit represented by Chemical Formula 6, may be 1:99 to 99:1, 40:60 to 95:5, or 50:50 to 90:10.

For example, when the molar ratio of $m^2$, $m^4$, $m^6$, $m^8$, $m^{10}$, $m^{12}$, $m^{14}$, $m^{16}$, or $m^{18}$ which is the number of the repeating unit derived from asymmetric diamine is regarded as $m^{even}$, $m^{even}$ may be 1 to 99 mol %, 5 to 60 mol %, or 10 to 50 mol %, and accordingly, when the molar ratio of $m^1$, $m^3$, $m^5$, $m^7$, $m^9$, $m^{11}$, $m^{13}$, $m^{15}$, or $m^{17}$ derived from the imide-containing diamine having the specific structure is regarded as $m^{odd}$, $m^{odd}$ may be $1-m^{even}$, that is, 99 to 1 mol %, 95 to 40 mol %, or 90 to 50 mol %.

In particular, when the copolymer for a liquid crystal alignment agent of the present invention includes the imidized imide repeating unit and the repeating unit derived from the asymmetric diamine in the above molar ratio, excellent photoreactive property and liquid crystal alignment property which are obtained from the imide repeating unit and the excellent electrical properties obtained from the repeating unit derived from the asymmetric diamine may complement each other, and therefore, excellent coating properties may be exhibited, thereby producing a liquid crystal alignment film which may implement a high imidization rate while having excellent processing properties, and may have excellent electrical properties such as an afterimage generated by the direct current/alternating voltage, and the voltage holding ratio, and a liquid crystal alignment film which may have an excellent alignment property and electrical properties at the same time.

On the other hand, among the repeating units represented by Chemical Formulae 1 to 6, the polymer according to one embodiment may include the repeating units represented by Chemical Formulae 1 to 4 which are derived from the imide-containing diamine having the specific structure, in an amount of 1 mol % to 99 mol %, preferably 20 mol % to 95 mol %, based on the total repeating units.

As described above, when the copolymer including a specific amount of the imide repeating units represented by Chemical Formulae 1 to 4 is used, the copolymer includes a predetermined amount of already imidized imide repeating units, and thus a liquid crystal alignment film having an excellent alignment property and stability can be produced even when the high-temperature heat treatment is omitted and light is directly irradiated.

If the repeating units represented by Chemical Formulae 1 to 4 are included at less than the above-mentioned content range, sufficient alignment properties may not be exhibited and alignment stability may be deteriorated. If the content of the repeating units represented by Chemical Formulae 1 to 4 exceeds the above-mentioned content range, there is a problem that the solubility is lowered and thus it is difficult to prepare a stable alignment solution capable of coating. Accordingly, it is preferable to include the repeating units represented by Chemical Formulae 1 to 4 within the above-mentioned content range, because it can provide a copolymer for a liquid crystal alignment agent having excellence in all of storage stability, electrical properties, alignment properties, and alignment stability.

Further, the repeating units represented by Chemical Formulae 5 and 6 may be included in an appropriate amount depending on the desired properties.

For example, the repeating unit represented by Chemical Formula 5 may be included in an amount of 0.1 mol % to 90 mol %, preferably 5 mol % to 80 mol %, based on the total repeating units represented by Chemical Formulae 1 to 4. When the repeating unit represented by Chemical Formula 5 is included in an amount of less than 0.1 mol %, excellent electrical properties may not be exhibited. When the repeating unit represented by Chemical Formula 5 is included in an amount of more than 90 mol %, alignment stability may be deteriorated. Therefore, the repeating unit represented by Chemical Formula 5 exhibits appropriate solubility within the above-mentioned range and thus may provide a copolymer for a liquid crystal alignment agent which may implement a high imidization rate while having excellent processing properties.

For example, the repeating unit represented by Chemical Formula 6 may be included in an amount of 0.1 mol % to 90 mol %, preferably 5 mol % to 80 mol %, based on the total repeating units represented by Chemical Formulae 1 to 4. Within such a range, excellent coating properties may be exhibited, thereby providing a copolymer for a liquid crystal alignment agent which may implement a high imidization rate while having excellent processing properties.

As described above, the copolymer for a liquid crystal alignment agent of the present invention may include a predetermined amount of already imidized imide repeating units, and thus anisotropy is directly generated by light irradiation without the high-temperature heat treatment after formation of the coating film, and subsequently, heat treatment is performed to complete an alignment film. In addition, the copolymer for a liquid crystal alignment agent of the present invention may include the repeating units derived from a diamine compound having a specific structure that is asymmetric with respect to the center point or the center line, and thus a high voltage holding ratio may be obtained even at a high temperature, and a reduction in contrast ratio or an afterimage phenomenon may be improved, thereby improving electrical properties.

The copolymer for a liquid crystal alignment agent may have a weight average molecular weight of 1000 g/mol to 200,000 g/mol. The weight average molecular weight means a weight average molecular weight in terms of polystyrene measured by a gel permeation chromatography (GPC) method. In the process of determining the weight average molecular weight in terms of polystyrene measured by the GPC method, a commonly known analyzing device, a detector such as a refractive index detector or a UV-detector, and an analytical column may be used. Commonly applied conditions of temperature, solvent, and flow rate may be used. Specific examples of the measurement conditions may include a temperature of 40° C., a mixed solvent of dimethylformamide (DMF)/tetrahydrofuran (THF), and a flow rate of 0.5 mL/min to 1.0 mL/min.

Such a polymer may be used as a liquid crystal alignment agent to provide a liquid crystal alignment film which realizes excellent stability and reliability.

Examples of the method of producing the copolymer for a liquid crystal alignment agent are not particularly limited. For example, a method of producing the copolymer for a liquid crystal alignment agent including the steps of: reacting a mixture including diamine of the following Chemical Formula 22 and diamine of the following Chemical Formula 23 with tetracarboxylic acid or an anhydride thereof; and imidizing the reaction product with tetracarboxylic acid or an anhydride thereof may be used:

[Chemical Formula 22]

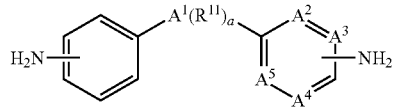

wherein, in Chemical Formula 22,
A$^1$ is an element of Group 16, R$^{11}$ is hydrogen or a C$_{1-10}$ alkyl, a is an integer of 0 to 3, and A$^2$, A$^3$, A$^4$, and A$^5$ are nitrogen or carbon, provided that at least one of A$^2$ to A$^5$ is nitrogen, and the rest are carbon,

[Chemical Formula 23]

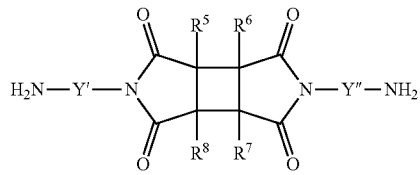

wherein, in Chemical Formula 23,
R$^5$, R$^6$, R$^7$, and R$^8$ are each independently hydrogen or a C$_{1-6}$ alkyl, and Y' and Y" are each independently a divalent organic group represented by the following Chemical Formula 24,

[Chemical Formula 24]

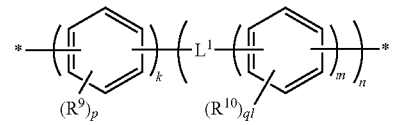

wherein, in Chemical Formula 24,
R$^9$ and R$^{10}$ are each independently a halogen, a cyano, a C$_{1-10}$ alkyl, a C$_{2-10}$ alkenyl, a C$_{1-10}$ alkoxy, a C$_{1-10}$ fluoroalkyl, or a C$_{1-10}$ fluoroalkoxy,
p and q are each independently an integer of 0 to 4,
L$^1$ is a single bond, —O—, —CO—, —S—, —SO$_2$—, —C(CH$_3$)$_2$—, —C(CF$_3$)$_2$—, —CONH—, —COO—, —(CH$_2$)$_z$—, —O(CH$_2$)$_z$O—, —O(CH$_2$)$_z$—, —OCH$_2$—C(CH$_3$)$_2$—CH$_2$O—, —COO—(CH$_2$)$_z$—OCO—, or —OCO—(CH$_2$)$_z$—COO—, wherein each z is independently an integer of 1 to 10,
k and m are each independently an integer of 0 to 3, and n is an integer of 0 to 3.

Preferably, in Chemical Formula 22, A$^1$ may be an oxygen atom, one of A$^2$ and A$^5$ may be nitrogen and the rest may be carbon, and A$^3$ and A$^4$ may be carbon.

Specific descriptions of the substituents in Chemical Formula 22, Chemical Formula 23, and Chemical Formula 24 are the same as those described in Chemical Formulae 1 to 6.

Here, the diamine of Chemical Formula 22 and the diamine of Chemical Formula 23 may be mixed at a molar ratio of 1:99 to 99:1, 40:60 to 95:5, or 50:50 to 90:10.

The mixture including the diamine of Chemical Formula 22 and the diamine of Chemical Formula 23 may be reacted with tetracarboxylic acid or an anhydride thereof commonly used for the preparation of polyamic acids, for example, pyromellitic dianhydride, 3,3',4,4'-biphenyl tetracarboxylic acid dianhydride, or 1,2,4,5-cyclohexanetetracarboxylic dianhydride, to prepare a copolymer composed of polyamic acid, polyamic acid ester, or a mixture thereof.

Alternatively, if necessary, in addition to the diamines of Chemical Formula 22 and Chemical Formula 23, various types of diamine compounds, which are widely known in the field generally related to liquid crystal alignment agents, for example, p-phenylenediamine, 4,4-oxydianiline, 4,4'-methylenedianiline, or the like, may be mixed to prepare polyamic acid, polyamic acid ester, or a mixture thereof.

The reaction conditions may be appropriately adjusted with reference to the production conditions of polyamic acid known in the technical field to which the present invention belongs. Then, the obtained polyamic acid, polyamic acid ester, or a mixture thereof may be imidized to prepare a copolymer for a liquid crystal alignment agent having the above-mentioned repeating units of Chemical Formulae 1 to 3 and the repeating units of Chemical Formulae 4 to 6 at the same time.

On the other hand, according to another embodiment of the invention, a liquid crystal alignment agent including the copolymer is provided.

Since the liquid crystal alignment agent includes the above-mentioned copolymer, it may secure an excellent alignment property without an initial thermosetting process, effectively suppress deterioration of stability and reliability due to the decomposition reaction of the polymer during the baking process and storage, and exhibit excellent coating properties and simultaneously exhibit an excellent imide conversion ratio.

Such a liquid crystal alignment agent may be provided through a variety of methods known in the technical field to which the present invention belongs, except that it includes the above-mentioned copolymer.

For a non-limiting example, the above-mentioned copolymer may be dissolved or dispersed in an organic solvent to provide a liquid crystal alignment agent.

Specific examples of the organic solvent include N,N-dimethylformamide, N,N-dimethylacetamide, N-methyl-2-pyrrolidone, N-methylcaprolactam, 2-pyrrolidone, N-ethylpyrrolidone, N-vinylpyrrolidone, dimethyl sulfoxide, tetramethylurea, pyridine, dimethyl sulfone, hexamethyl sulfoxide, γ-butyrolactone, 3-methoxy-N,N-dimethylpropanamide, 3-ethoxy-N,N-dimethylpropanamide, 3-butoxy-N,N-dimethylpropanamide, 1,3-dimethyl-imidazolidinone, ethyl amyl ketone, methyl nonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, and the like. These solvents may be used alone or in a mixture thereof.

In addition, the liquid crystal alignment agent may further include other components in addition to the copolymer and the organic solvent. For a non-limiting example, when the liquid crystal alignment agent has been coated, an additive capable of improving the uniformity of film thickness or the surface smoothness, improving adhesion between the liquid crystal alignment film and the substrate, changing the dielectric constant and conductivity of a liquid crystal alignment film, or increasing the denseness of the liquid crystal alignment film, may be further included. Such additive may be exemplified by a variety of solvents, surfactants, silane-based compounds, dielectric substances, crosslinkable compounds, etc.

On the other hand, according to still another embodiment of the invention, a method of producing a liquid crystal alignment film using the liquid crystal alignment agent as described above is provided. The method of producing a liquid crystal alignment film may include the steps of: coating the liquid crystal alignment agent onto a substrate to form a coating film (step 1); drying the coating film (step 2); irradiating the coating film with light or rubbing the coating film immediately after the drying step to perform an alignment treatment (step 3); and heat-treating and curing the alignment-treated coating film (step 4).

The step 1 is a step of coating the above-described liquid crystal alignment agent onto a substrate to form a coating film.

The method of coating the liquid crystal alignment agent onto a substrate is not particularly limited, and for example, a method such as screen printing, offset printing, flexographic printing, inkjet, and the like may be used.

Furthermore, the liquid crystal alignment agent may be those which are dissolved or dispersed in an organic solvent. Specific examples of the organic solvent include N,N-dimethylformamide, N,N-dimethylacetamide, N-methyl-2-pyrrolidone, N-methylcaprolactam, 2-pyrrolidone, N-ethylpyrrolidone, N-vinylpyrrolidone, dimethyl sulfoxide, tetramethylurea, pyridine, dimethyl sulfone, hexamethyl sulfoxide, γ-butyrolactone, 3-methoxy-N,N-dimethylpropanamide, 3-ethoxy-N,N-dimethylpropanamide, 3-butoxy-N,N-dimethylpropanamide, 1,3-dimethyl-imidazolidinone, ethyl amyl ketone, methyl nonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, ethylene glycol monomethyl ether, ethylene glycol monomethyl ether acetate, ethylene glycol monoethyl ether, ethylene glycol monoethyl ether acetate, ethylene glycol monopropyl ether, ethylene glycol monopropyl ether acetate, ethylene glycol monoisopropyl ether, ethylene glycol monoisopropyl ether acetate, ethylene glycol monobutyl ether, ethylene glycol monobutyl ether acetate, and the like. These solvents may be used alone or in a mixture thereof.

In addition, the liquid crystal alignment agent may further include other components in addition to the organic solvent. For a non-limiting example, when the liquid crystal alignment agent has been coated, an additive capable of improving the uniformity of film thickness or surface smoothness, improving adhesion between the liquid crystal alignment film and the substrate, changing the dielectric constant and conductivity of a liquid crystal alignment film, or increasing the denseness of the liquid crystal alignment film, may be further included. Such an additive may be exemplified by a variety of solvents, surfactants, silane-based compounds, dielectric substances, crosslinkable compounds, etc.

The step 2 is a step of drying the coating film which is formed by coating the liquid crystal alignment agent onto a substrate.

In the step of drying the coating film, a method such as heating of a coating film or vacuum evaporation may be used, and the drying may be preferably carried out at 50° C. to 150° C., or at 60° C. to 140° C.

The step 3 is a step of irradiating the coating film with light or rubbing the coating film immediately after the drying step to perform alignment treatment.

In the present disclosure, the "irradiating the coating film immediately after the drying step" means that light is directly irradiated, after the drying step, without carrying out heat treatment at a temperature equal to or higher than that of the drying step, and steps other than the heat treatment may be added.

More specifically, when a liquid crystal alignment film is prepared using a conventional liquid crystal alignment agent including polyamic acid or polyamic acid ester, it includes a step of irradiating light after essentially performing a high-temperature heat treatment for imidization of polyamic acid. However, when a liquid crystal alignment film is prepared using the liquid crystal alignment agent of one embodiment described above, it does not include the heat treatment step, but light is directly irradiated to perform alignment treatment, and then the alignment-treated coating film is cured by heat treatment, thereby preparing a liquid crystal alignment film.

In the alignment treatment step, the light irradiation is performed by irradiating polarized ultraviolet rays having a wavelength of 150 nm to 450 nm. In this case, the intensity of the light exposure may vary depending on the kind of the copolymer for a liquid crystal alignment agent, and preferably, energy of 10 mJ/cm$^2$ to 10 J/cm$^2$, and more preferably energy of 30 mJ/cm$^2$ to 2 J/cm$^2$, may be irradiated.

As for the ultraviolet rays, polarized ultraviolet rays selected among ultraviolet rays subjected to polarization treatment by a method of passing through or reflecting with a polarizing device using a substrate in which a dielectric anisotropic material is coated on the surface of a transparent substrate such as quartz glass, soda lime glass, soda lime-free glass, etc., a polarizer plate on which aluminum or metal wires are finely deposited, or a Brewster's polarizing device by the reflection of quartz glass, etc., are irradiated to perform the alignment treatment. Herein, the polarized ultraviolet rays may be irradiated perpendicularly to the surface of the substrate, or may be irradiated by directing at an angle of incidence toward a specific angle. By this method, the alignment ability of the liquid crystal molecules is imparted to the coating film.

Further, in the alignment treatment step, a rubbing treatment may use a method of using a rubbing cloth. More specifically, in the rubbing treatment, the surface of the coating film after the drying treatment step may be rubbed in one direction while rotating a rubbing roller of which a rubbing cloth is attached to a metal roller.

The step 4 is a step of heat-treating and curing the alignment-treated coating film.

The step of heat-treating and curing the alignment-treated coating film is a step that is carried out after the irradiation of light even in the method of preparing a liquid crystal alignment film using a copolymer for a liquid crystal alignment agent including polyamic acid or polyamic acid ester in the past, and is distinguished from the step of heat treatment performed for imidizing the liquid crystal alignment agent before irradiating light or while irradiating light, after coating the liquid crystal alignment agent onto a substrate.

Herein, the heat treatment may be carried out by a heating means such as a hot plate, a hot air circulation path, an infrared ray furnace, and the like, and the heat treatment is preferably carried out at a temperature of 150° C. to 300° C., or 180° C. to 250° C.

On the other hand, after a step of drying the coating film (step 2), a step of heat-treating the coating film immediately after the drying step at a temperature equal to or higher than that of the drying step may be further included, if necessary. The heat treatment may be performed by a heating means such as a hot plate, a hot air circulation path, an infrared furnace, or the like, and is preferably performed at 150° C. to 250° C. In this process, the liquid crystal alignment agent may be imidized.

That is, the method of producing a liquid crystal alignment film may include the steps of: coating the above-mentioned liquid crystal alignment agent onto a substrate to form a coating film (step 1); drying the coating film (step 2); heat-treating the coating film immediately after the drying step at a temperature equal to or higher than that of the drying step (step 3); irradiating the heat-treated coating film with light or rubbing the coating film to perform alignment treatment (step 4); and heat-treating and curing the alignment-treated coating film (step 5).

According to still another embodiment of the invention, a liquid crystal alignment film produced by the above-described method is provided.

As described above, when the liquid crystal alignment agent composed of the copolymer including one or more repeating units selected from the group consisting of the repeating units represented by Chemical Formula 1, Chemical Formula 2, and Chemical Formula 3 along with one or more repeating units selected from the group consisting of the repeating units represented by Chemical Formula 4, Chemical Formula 5, and Chemical Formula 6 is used, it is possible to produce a liquid crystal alignment film having enhanced durability according to the improvement of film strength.

According to still another embodiment of the present invention, a liquid crystal display device including the liquid crystal alignment film described above is provided.

The liquid crystal alignment film may be introduced into a liquid crystal cell by a known method, and likewise, the liquid crystal cell may be introduced into a liquid crystal display device by a known method. The liquid crystal alignment film may be produced from the copolymer including one or more of the repeating units represented by Chemical Formulae 1 to 3 and one or more of the repeating units represented by Chemical Formulae 4 to 6, and thus may implement excellent stability together with excellent physical properties. Specifically, it is possible to provide a liquid crystal display device having excellent electrical properties due to a high voltage holding ratio at a high temperature and a low frequency, having a reduction in the deterioration of the contrast ratio or in an image sticking (afterimage) phenomenon, and also having excellent film strength.

Advantageous Effects

According to the present invention, a copolymer for a liquid crystal alignment agent having excellent liquid crystal alignment and electrical properties, and a preparation method thereof, may be provided.

DETAILED DESCRIPTION OF THE EMBODIMENTS

Hereinafter, the present invention will be described in more detail in the following examples. However, these examples are for illustrative purposes only, and the scope of the present invention is not intended to be limited by the following examples.

PREPARATION EXAMPLES 1~2

Preparation of Diamine

Preparation Example 1

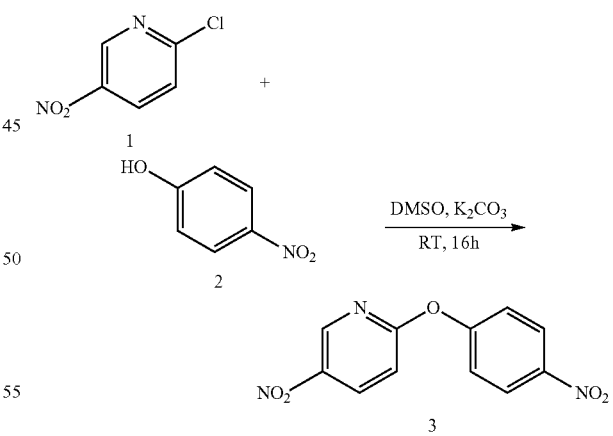

After 17.1 g (100 mmol) of 2-chloro-5-nitropyridine (compound 1) and 12.5 g (98.6 mmol) of 4-nitrophenol (compound 2) were completely dissolved in about 200 mL of dimethyl sulfoxide (DMSO), 27.2 g (200 mmol) of potassium carbonate ($K_2CO_3$) was added thereto, and the mixture was stirred at room temperature for 16 hours. When the reaction was completed, the reaction product was charged into a container containing about 500 mL of water and stirred for about 1 hour. A solid obtained by filtration thereof was washed with about 200 mL of water and about 200 mL of ethanol to synthesize 16 g (61.3 mmol) of a compound 3 (yield: 57%).

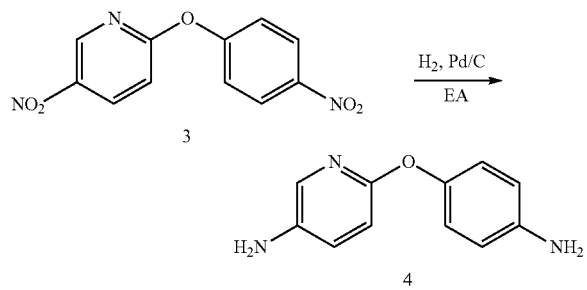

The compound 3 was dissolved in about 200 mL of a 1:1 mixed solution of ethyl acetate (EA) and THF, 0.8 g of palladium (Pd)/carbon (C) was added thereto, and the mixture was stirred for about 12 hours under a hydrogen atmosphere. After completion of the reaction, the reaction mixture was filtered through a pad of Celite and then concentrated to obtain 11 g of a diamine (pODA) compound 4 (yield: 89%).

$^1$H NMR (500 MHz, DMSO-d6) δ 7.48 (dd, J=3.0, 0.7 Hz, 1H), 7.01 (dd, J=8.6, 3.0 Hz, 1H), 6.70-6.66 (m, 2H), 6.58 (dd, J=8.6, 0.6 Hz, 1H), 6.55-6.50 (m, 2H), 4.92 (s, 2H), 4.85 (s, 2H).

Preparation Example 2

1,3-dimethylcyclobutane-1,2,3,4-tetracarboxylic acid dianhydride (DMCBDA, compound 5) and 4-nitroaniline were dissolved in dimethylformamide (DMF) to prepare a mixture. Subsequently, the mixture was allowed to react at about 80° C. for about 12 hours to prepare polyamic acid of compound 6. Next, the polyamic acid was dissolved in DMF, and acetic acid anhydride and sodium acetate were added to prepare a mixture. Then, polyamic acid of compound 6 included in the mixture was imidized at about 90° C. for about 4 hours to obtain a compound 7. The imide of compound 7 thus obtained was dissolved in dimethylacetamide (DMAc), and then Pd/C was added to prepare a mixture. The mixture was reduced at about 45° C. under a hydrogen atmosphere of about 6 bar for 20 hours to prepare a diamine compound 8 (DMICPD).

SYNTHESIS EXAMPLES 1~8 AND COMPARATIVE SYNTHESIS EXAMPLES 1~4

Synthesis of Polymer For Liquid Crystal Alignment Agent

Synthesis Example 1

1.930 g (0.010 mol) of the diamine (pODA) prepared in Preparation Example 1 and 34.918 g (0.086 mol) of the diamine (DMICPD) prepared in Preparation Example 2 were completely dissolved in 322.144 g of anhydrous N-methyl pyrrolidone (NMP).

Then, under an ice bath, 20.0 g (0.089 mol) of 1,3-dimethylcyclobutane-1,2,3,4-tetracarboxylic acid dianhydride (DMCBDA) was added to the solution and stirred at

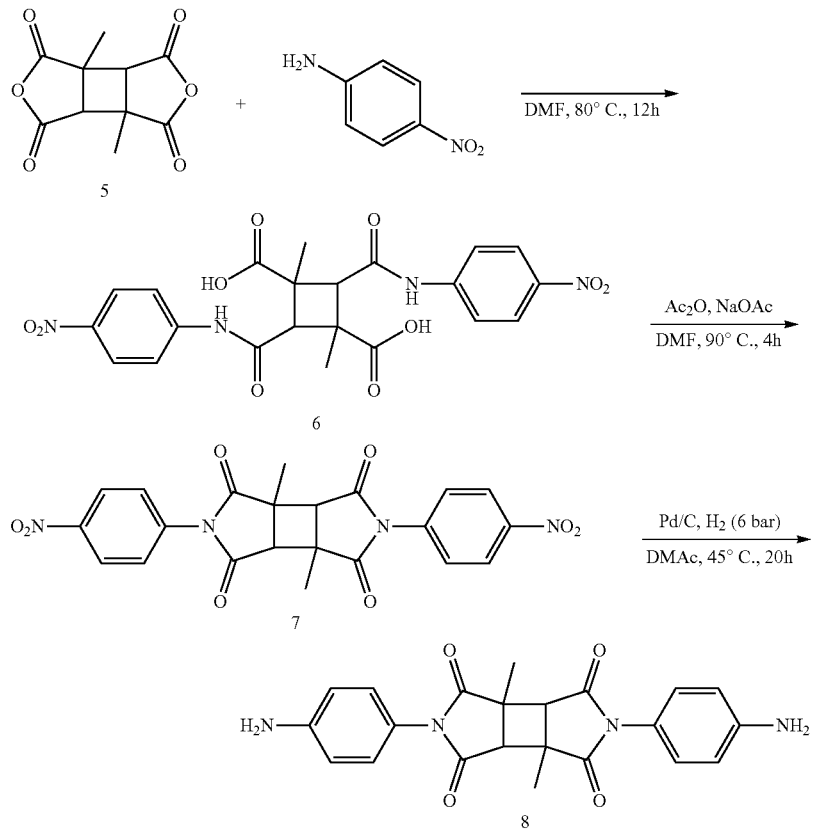

room temperature for about 16 hours to prepare a copolymer P-1 for a liquid crystal alignment agent. The molecular weight of the copolymer was confirmed by GPC, and as a result, the weight average molecular weight (Mw) was 24,000 g/mol.

Synthesis Example 2

7.239 g (0.036 mol) of the diamine (pODA) prepared in Preparation Example 1 and 14.549 g (0.036 mol) of the diamine (DMICPD) prepared in Preparation Example 2 were completely dissolved in 208.469 g of anhydrous N-methyl pyrrolidone (NMP).

Then, under an ice bath, 15.0 g (0.067 mol) of 1,3-dimethylcyclobutane-1,2,3,4-tetracarboxylic acid dianhydride (DMCBDA) was added to the solution and stirred at room temperature for about 16 hours to prepare a copolymer P-2 for a liquid crystal alignment agent. The molecular weight of the copolymer was confirmed by GPC, and as a result, the weight average molecular weight (Mw) was 25,000 g/mol.

Synthesis Example 3

1.984 g (0.010 mol) of the diamine (pODA) prepared in Preparation Example 1 and 35.887 g (0.089 mol) of the diamine (DMICPD) prepared in Preparation Example 2 were completely dissolved in 327.936 g of anhydrous N-methyl pyrrolidone (NMP).

Then, under an ice bath, 20.0 g (0.092 mol) of pyromellitic dianhydride (PMDA) was added to the solution and stirred at room temperature for about 16 hours to prepare a copolymer P-3 for a liquid crystal alignment agent. The molecular weight of the copolymer was confirmed by GPC, and as a result, the weight average molecular weight (Mw) was 24,500 g/mol.

Synthesis Example 4

7.440 g (0.037 mol) of the diamine (pODA) prepared in Preparation Example 1 and 14.953 g (0.037 mol) of the diamine (DMICPD) prepared in Preparation Example 2 were completely dissolved in 211.894 g of anhydrous N-methyl pyrrolidone (NMP).

Then, under an ice bath, 15.0 g (0.069 mol) of pyromellitic dianhydride (PMDA) was added to the solution and stirred at room temperature for about 16 hours to prepare a copolymer P-4 for a liquid crystal alignment agent. The molecular weight of the copolymer was confirmed by GPC, and as a result, the weight average molecular weight (Mw) was 25,500 g/mol.

Synthesis Example 5

1.471 g (0.007 mol) of the diamine (pODA) prepared in Preparation Example 1 and 26.605 g (0.066 mol) of the diamine (DMICPD) prepared in Preparation Example 2 were completely dissolved in 272.429 g of anhydrous N-methyl pyrrolidone (NMP).

Then, under an ice bath, 20.0 g (0.068 mol) of biphenyl tetracarboxylic dianhydride (BPDA) was added to the solution and stirred at room temperature for about 16 hours to prepare a copolymer P-5 for a liquid crystal alignment agent. The molecular weight of the copolymer was confirmed by GPC, and as a result, the weight average molecular weight (Mw) was 25,500 g/mol.

Synthesis Example 6

7.354 g (0.037 mol) of the diamine (pODA) prepared in Preparation Example 1 and 14.780 g (0.037 mol) of the diamine (DMICPD) prepared in Preparation Example 2 were completely dissolved in 238.763 g of anhydrous N-methyl pyrrolidone (NMP).

Then, under an ice bath, 20.0 g (0.068 mol) of biphenyl tetracarboxylic dianhydride (BPDA) was added to the solution and stirred at room temperature for about 16 hours to prepare a copolymer P-6 for a liquid crystal alignment agent. The molecular weight of the copolymer was confirmed by GPC, and as a result, the weight average molecular weight (Mw) was 24,000 g/mol.

Synthesis Example 7

1.930 g (0.010 mol) of the diamine (pODA) prepared in Preparation Example 1 and 34.918 g (0.086 mol) of the diamine (DMICPD) prepared in Preparation Example 2 were completely dissolved in 322.144 g of anhydrous N-methyl pyrrolidone (NMP).

Then, under an ice bath, 20.0 g (0.089 mol) of cyclohexane dianhydride (CHDA) was added to the solution and stirred at room temperature for about 16 hours to prepare a copolymer P-7 for a liquid crystal alignment agent. The molecular weight of the copolymer was confirmed by GPC, and as a result, the weight average molecular weight (Mw) was 26,000 g/mol.

Synthesis Example 8

9.652 g (0.048 mol) of the diamine (pODA) prepared in Preparation Example 1 and 19.399 g (0.048 mol) of the diamine (DMICPD) prepared in Preparation Example 2 were completely dissolved in 277.958 g of anhydrous N-methyl pyrrolidone (NMP).

Then, under an ice bath, 20.0 g (0.089 mol) of cyclohexane dianhydride (CHDA) was added to the solution and stirred at room temperature for about 16 hours to prepare a copolymer P-8 for a liquid crystal alignment agent. The molecular weight of the copolymer was confirmed by GPC, and as a result, the weight average molecular weight (Mw) was 25,000 g/mol.

Comparative Synthesis Example 1

10.374 g (0.096 mol) of p-phenylenediamine (p-PDA) was completely dissolved in 172.121 g of anhydrous N-methyl pyrrolidone (NMP).

Then, under an ice bath, 20.0 g (0.089 mol) of 1,3-dimethylcyclobutane-1,2,3,4-tetracarboxylic acid dianhydride (DMCBDA) was added to the solution and stirred at room temperature for about 16 hours to prepare a polymer R-1 for a liquid crystal alignment agent. The molecular weight of the polymer was confirmed by GPC, and as a result, the weight average molecular weight (Mw) was 25,000 g/mol.

Comparative Synthesis Example 2

19.399 g (0.048 mol) of the diamine (DMICPD) prepared in Preparation Example 2 and 9.510 g (0.048 mol) of methylene diphenyl diamine (MDA) were completely dissolved in 277.154 g of anhydrous N-methyl pyrrolidone (NMP).

Then, under an ice bath, 20.0 g (0.089 mol) of 1,3-dimethylcyclobutane-1,2,3,4-tetracarboxylic acid dianhydride (DMCBDA) was added to the solution and stirred at room temperature for about 16 hours to prepare a polymer R-2 for a liquid crystal alignment agent. The molecular weight of the copolymer was confirmed by GPC, and as a result, the weight average molecular weight (Mw) was 27,000 g/mol.

Comparative Synthesis Example 3

9.652 g (0.048 mol) of the diamine (pODA) prepared in Preparation Example 1 and 5.187 g (0.048 mol) of p-phenylenediamine (p-PDA) were completely dissolved in 197.424 g of anhydrous N-methyl pyrrolidone (NMP).

Then, under an ice bath, 20.0 g (0.089 mol) of 1,3-dimethylcyclobutane-1,2,3,4-tetracarboxylic acid dianhydride (DMCBDA) was added to the solution and stirred at room temperature for about 16 hours to prepare a polymer R-3 for a liquid crystal alignment agent. The molecular weight of the copolymer was confirmed by GPC, and as a result, the weight average molecular weight (Mw) was 23,500 g/mol.

Comparative Synthesis Example 4

A copolymer S-1 for a liquid crystal alignment agent was prepared in the same manner as in Synthesis Example 1, except that 2,6-bis(trifluroromethyl)-4,4'-diaminodiphenyl ether represented by the following Chemical Formula A was used instead of the diamine (pODA) compound 4 prepared in Preparation Example 1.

[Chemical Formula A]

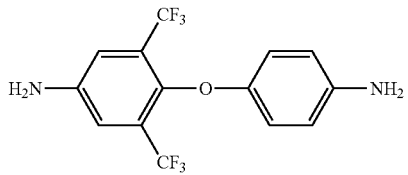

EXAMPLES 1~8 AND COMPARATIVE EXAMPLES 1~4

Preparation of Liquid Crystal Alignment Agent

Example 1

20 g of the copolymer (P-1) for a liquid crystal alignment agent of Synthesis Example 1 was dissolved in a mixed solvent of 8.65 g of NMP, 19.95 g of γ-butyrolactone (GBL), and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent A-1.

Example 2

20 g of the copolymer (P-2) for a liquid crystal alignment agent of Synthesis Example 2 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent A-2.

Example 3

20 g of the copolymer (P-3) for a liquid crystal alignment agent of Synthesis Example 3 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent A-3.

Example 4

20 g of the copolymer (P-4) for a liquid crystal alignment agent of Synthesis Example 4 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent A-4.

Example 5

20 g of the copolymer (P-5) for a liquid crystal alignment agent of Synthesis Example 5 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent A-5.

Example 6

20 g of the copolymer (P-6) for a liquid crystal alignment agent of Synthesis Example 6 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent A-6.

Example 7

20 g of the copolymer (P-7) for a liquid crystal alignment agent of Synthesis Example 7 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent A-7.

Example 8

20 g of the copolymer (P-8) for a liquid crystal alignment agent of Synthesis Example 8 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent A-3.

Comparative Example 1

20 g of the copolymer (R-1) for a liquid crystal alignment agent of Comparative Synthesis Example 1 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent R'-1.

Comparative Example 2

20 g of the copolymer (R-2) for a liquid crystal alignment agent of Comparative Synthesis Example 2 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent R'-2.

Comparative Example 3

20 g of the copolymer (R-3) for a liquid crystal alignment agent of Comparative Synthesis Example 3 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent R'-3.

Comparative Example 4

20 g of the copolymer (S-1) for a liquid crystal alignment agent of Comparative Synthesis Example 4 was dissolved in a mixed solvent of 8.65 g of NMP, 19.95 g of GBL, and 11.4 g of 2-butoxyethanol to obtain a 5 wt % solution. Then, the solution thus obtained was subjected to pressure filtration using a filter having a pore size of 0.1 μm and made of poly(tetrafluoroethylene) to prepare a liquid crystal alignment agent S'-1.

Experimental Example

Measurement of Physical Properties of Liquid Crystal Alignment Agent

1) Preparation of Liquid Crystal Alignment Cell

Each of the liquid crystal alignment agents obtained in Examples 1 to 8 and Comparative Examples 1 to 4 was used to prepare a liquid crystal alignment cell.

Specifically, the liquid crystal alignment agent was coated onto the upper and lower substrates for a voltage holding ratio (VHR) in which ITO electrodes with a thickness of 60 nm and an area of 1 cm×1 cm were patterned on a square glass substrate with a size of 2.5 cm×2.7 cm by a spin coating method, respectively. Then, the substrates coated with the liquid crystal alignment agent were placed on a hot plate at about 70° C. and dried for 3 minutes to evaporate the solvent. For alignment treatment of the coated substrates thus obtained, each of upper and lower coated substrates was irradiated with UV of 254 nm using an exposure equipped with a line polarizer. Thereafter, the alignment-treated upper and lower substrates were baked (cured) in an oven at about 230° C. for about 30 minutes to obtain a coating film with a thickness of 0.1 μm. Thereafter, a sealing agent impregnated with ball spacers with a size of 4.5 μm was coated onto the edges of the upper substrate excluding a liquid crystal inlet. The alignment films formed on the upper and lower substrates were then aligned such that they faced each other and the alignment directions were aligned with each other, and the upper and lower substrates were bonded together and the sealing agent was cured with UV and heat to prepare an empty cell. Then, a liquid crystal was injected into the empty cells, and the inlet was sealed with a sealing agent to prepare a liquid crystal alignment cell.

2) Measurement of Voltage Holding Ratio (VHR)

The voltage holding ratio (VHR) which is an electrical property of the liquid crystal alignment cell thus prepared was measured using 6254C equipment manufactured by TOYO Corporation. The voltage holding ratio (VHR) was measured at 1 Hz and 60° C. (VHR 60 degrees 1 Hz n-LC conditions). The results of measuring the voltage holding ratios (VHR) of the liquid crystal alignment cells are shown in the following Table 1.

3) Evaluation of Liquid Crystal Alignment Characteristics (Alternating Current (AC) Afterimage)

Polarizing plates were attached to the upper and lower substrate plates of the above prepared liquid crystal alignment cell so as to be perpendicular to each other. The polarizing plate-attached liquid crystal alignment cell was attached on a backlight having luminance of 7000 cd/cm$^2$, and the luminance in a black state was measured using a luminance measuring instrument PR-880. Then, the liquid crystal cell was operated at room temperature with an alternating voltage of 5 V for 24 hours. Thereafter, in the voltage-off state of the liquid crystal cell, luminance in the black state was measured as described above. A difference between the initial luminance ($L_O$) measured before operation of the liquid crystal cell and the later luminance ($L_1$) measured after operation was divided by the initial luminance ($L_O$), and then multiplied by 100 to calculate a luminance fluctuation rate. When the calculated luminance fluctuation rate is close to 0%, it means that the alignment stability is excellent.

Through the measurement results of the luminance fluctuation rate, the afterimage level was evaluated under the following criteria. It is preferable to minimize an AC afterimage. According to the measurement results, when the luminance fluctuation rate was less than 10%, it was evaluated as "excellent", when the luminance fluctuation rate was 10% to 20%, it was evaluated as "ordinary", and when the luminance fluctuation rate was more than 20%, it was evaluated as "poor". The results are shown in Table 1 below.

TABLE 1

| | liquid crystal agent | First diamine Type | Content (mmol) | Second diamine Type | Content (mmol) | Dianhydride Type | Content (mmol) | Evaluation of physical property of liquid crystal cell* AC afterimage | VHR (%) |
|---|---|---|---|---|---|---|---|---|---|
| Example 1 | A-1 | PODA | 10 | DMICPD | 86 | DMCBDA | 89 | Excellent | 73 |
| Example 2 | A-2 | PODA | 36 | DMICPD | 36 | DMCBDA | 67 | Excellent | 71 |
| Example 3 | A-3 | PODA | 10 | DMICPD | 89 | PMDA | 92 | Excellent | 68 |
| Example 4 | A-4 | PODA | 37 | DMICPD | 37 | PDMA | 69 | Excellent | 70 |
| Example 5 | A-5 | PODA | 7 | DMICPD | 66 | BPDA | 68 | Excellent | 70 |
| Example 6 | A-6 | PODA | 37 | DMICPD | 37 | BPDA | 68 | Excellent | 69 |
| Example 7 | A-7 | PODA | 10 | DMICPD | 86 | CHDA | 89 | Excellent | 72 |
| Example 8 | A-8 | PODA | 48 | DMICPD | 48 | CHDA | 89 | Excellent | 71 |
| Comparative Example 1 | R'-1 | PDA | 96 | — | — | DMCBDA | 89 | Poor | 37 |
| Comparative Example 2 | R'-2 | MDA | 48 | DMICPD | 48 | DMCBDA | 89 | Excellent | 34 |
| Comparative Example 3 | R'-3 | PODA | 48 | PDA | 48 | DMCBDA | 89 | Poor | 70 |
| Comparative Example 4 | S'-1 | Chemical Formula A | 10 | DMICPD | 86 | DMCBDA | 89 | Poor | 33 |

*Measured under an exposure dose of 0.1 to 0.5 J/cm²

As shown in Table 1, it was confirmed that since each of the liquid crystal alignment agents of Examples 1 to 8 includes the copolymer produced from the reaction product containing the imide-containing first diamine having a specific structure along with the second diamine having a specific asymmetric structure, an excellent alignment property may be obtained without an initial thermosetting process, the voltage holding ratio (VHR) may be improved to as high as about 68% to about 73%, and the AC afterimage may be maintained at an equivalent level or more.

Particularly, the liquid crystal alignment agents of Examples 1 to 8 may exhibit an excellent coating property to implement a high imidization rate while having excellent processing properties, and may also exhibit excellent effects in terms of electrical properties such as voltage holding ratio and direct current (DC) afterimage generated by the direct current/alternating voltage.

In contrast, in the case of the liquid crystal alignment agents of Comparative Examples 1 to 4, none of the imide-containing diamine having a specific structure and the diamine having a specific asymmetric structure were included or one of them was included in the reaction product during the preparation of the polymer, and as a result, electrical properties or alignment properties of the liquid crystal cells were remarkably deteriorated.

In particular, in the case of Comparative Example 1, the polymer including only para-phenylenediamine (p-PDA) as the diamine component was used, and as a result, it showed a remarkably reduced voltage holding ratio (VHR) of about 37% and also showed a luminance fluctuation rate of more than 20%, and was thus evaluated as 'poor' in the AC afterimage test. In the case of Comparative Example 2, of the copolymers, diamine (DMICPD) having a specific asymmetric structure was used, but methylene diphenyl diamine (MDA) was used instead of the imide-containing first diamine. As a result, there was no problem in the liquid crystal alignment properties, but it showed a remarkably reduced voltage holding ratio (VHR) of about 34%. In the case of Comparative Example 3, of the copolymers, the imide-containing diamine (p-ODA) having a specific structure was used, but para-phenylenediamine (p-PDA) was used instead of the second diamine having a specific asymmetric structure. As a result, the voltage holding ratio (VHR) may be maintained at the equivalent level or more, but there was a problem that a luminance fluctuation rate of more than 20% was observed, and thus was evaluated as 'poor' in the AC afterimage test.

The invention claimed is:

1. A copolymer for a liquid crystal alignment agent comprising:

one or more repeating units selected from the group of a repeating unit represented by Chemical Formula 1, a repeating unit represented by Chemical Formula 2, and a repeating unit represented by Chemical Formula 3; and one or more repeating units selected from the group of a repeating unit represented by Chemical Formula 4, a repeating unit represented by Chemical Formula 5, and a repeating unit represented by Chemical Formula 6:

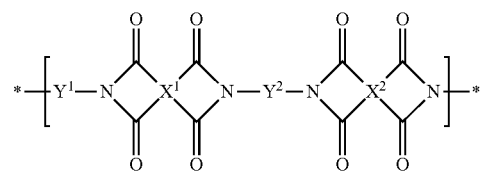

Chemical Formula 1

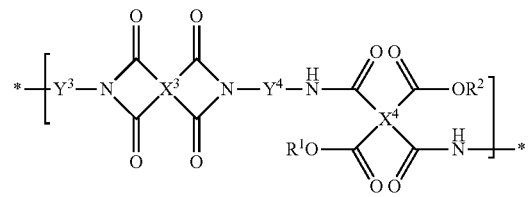

Chemical Formula 2

31
-continued

Chemical Formula 3

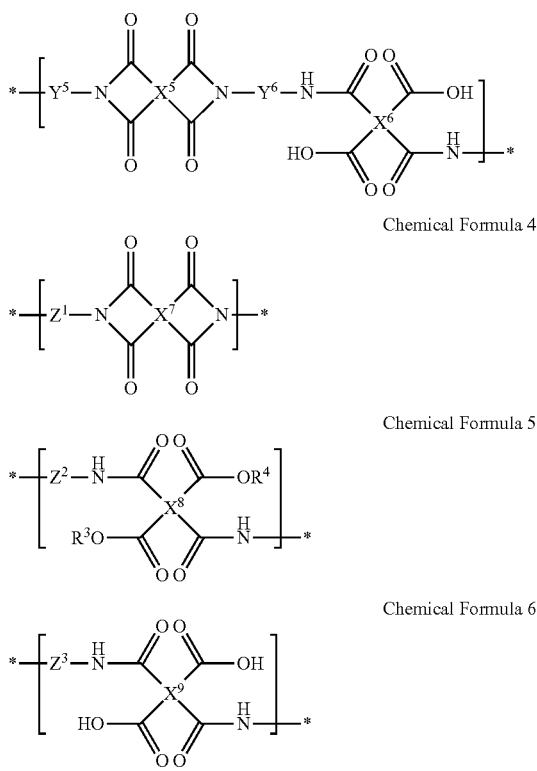

Chemical Formula 4

Chemical Formula 5

Chemical Formula 6 wherein, in the Chemical Formulae 1 to 6, $R^1$, $R^2$, $R^3$, and $R^4$ are each independently hydrogen or a $C_{1-10}$ alkyl, provided that $R^1$ and $R^2$ are not both hydrogen, and that $R^3$ and $R^4$ are not both hydrogen, $X^1$, $X^3$, and $X^5$ are each independently a tetravalent organic group represented by Chemical Formula 7:

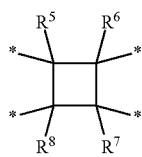

wherein, in the Chemical Formula 7, $R^5$, $R^6$, $R^7$, and $R^8$ are each independently hydrogen or a $C_{1-6}$ alkyl, $X^2$, $X^4$, $X^6$, $X^7$, $X^8$, and $X^9$ are each independently a tetravalent organic group derived from a hydrocarbon having 4 to 20 carbon atoms or a tetravalent organic group, wherein in the tetravalent organic group, one or more of H is substituted with a halogen or one or more of —$CH_2$— is substituted with —O—, —CO—, —S—, —SO—, —$SO_2$—, or —CONH— to prevent direct binding with oxygen or sulfur atoms, in Chemical Formulae 1 to 3, $Y^1$, $Y^2$, $Y^3$, $Y^4$, $Y^5$, and $Y^6$ are each independently a divalent organic group represented by Chemical Formula 8:

32

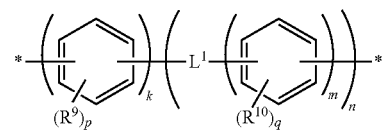

wherein, in the Chemical Formula 8, $R^9$ and $R^{10}$ are each independently a halogen, a cyano, a $C_{1-10}$ alkyl, a $C_{2-10}$ alkenyl, a $C_{1-10}$ alkoxy, a $C_{1-10}$ fluoroalkyl, or a $C_{1-10}$ fluoroalkoxy, p and q are each independently an integer of 0 to 4, $L^1$ is a single bond, —O—, —CO—, —S—, —$SO_2$—, —$C(CH_3)_2$—, —$C(CF_3)_2$—, —CONH—, —COO—, —$(CH_2)_z$—, —$O(CH_2)_zO$—, —$O(CH_2)_z$—, —$OCH_2$—$C(CH_3)_2$—$CH_2O$—, —COO—$(CH_2)_z$—OCO—, or —OCO—$(CH_2)_z$—COO—, wherein each z is independently an integer of 1 to 10, k and m are each independently an integer of 0 to 3, and n is an integer of 0 to 3, wherein when n=0, k is 1 to 3, and wherein when k=0, m and n are each independently 1 to 3, in the Chemical Formulae 4 to 6, $Z^1$, $Z^2$, and $Z^3$ are each independently a divalent organic group represented by Chemical Formula 9:

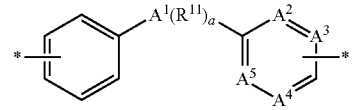

wherein, in the Chemical Formula 9, $A^1$ is oxygen, sulfur, selenium, tellurium or polonium, $R^{11}$ is hydrogen or a $C_{1-10}$ alkyl, a is an integer of 0, and $A^2$, $A^3$, $A^4$, and $A^5$ are nitrogen or carbon, provided that at least one of $A^2$ to $A^5$ is nitrogen and the rest are carbon.

2. The copolymer for a liquid crystal alignment agent according to claim 1, wherein $X^2$, $X^4$, $X^6$, $X^7$, $X^8$, and $X^9$ each independently include a tetravalent organic group represented by Chemical Formula 10:

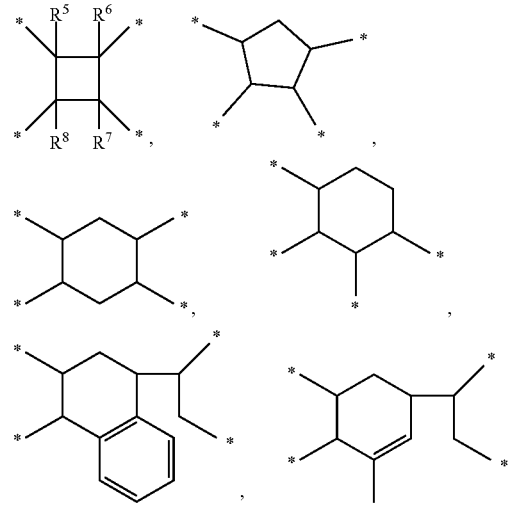

-continued

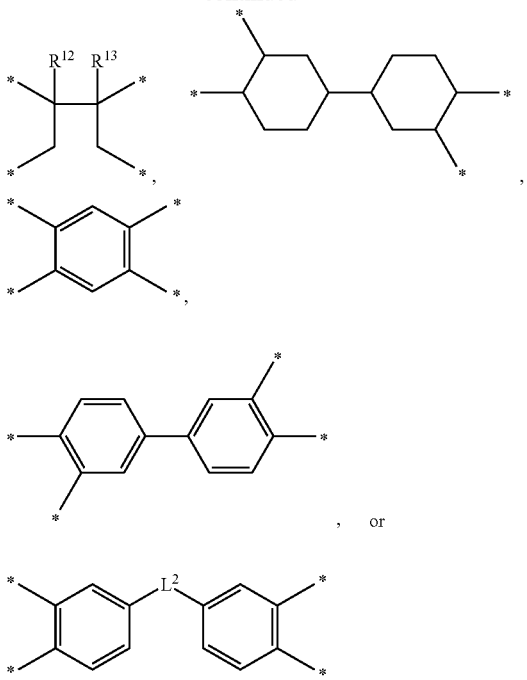

wherein, in the Chemical Formula 10,
$R^5$, $R^6$, $R^7$, and $R^8$ are each independently hydrogen or a $C_{1-6}$ alkyl,
$R^{12}$ and $R^{13}$ are each independently hydrogen or a $C_{1-10}$ alkyl,
$L^2$ is any one selected from the group of a single bond, —O—, —CO—, —S—, —SO—, —SO$_2$—, —CR$^{14}$R$^{15}$—, —CONH—, —COO—, —(CH$_2$)$_b$—, —O(CH$_2$)$_b$O—, —COO—(CH$_2$)$_b$—OCO—, —HN—(CH$_2$)$_b$—NH—, —R$^{14}$N—(CH$_2$)$_b$—NR$^{15}$—, phenylene, and combinations thereof, wherein each of $R^{14}$ and $R^{15}$ is independently hydrogen, a $C_{1-10}$ alkyl, or a $C_{1-10}$ fluoroalkyl, and each b is independently an integer of 1 to 10.

3. The copolymer for a liquid crystal alignment agent according to claim 1, wherein the Chemical Formula 8 is a divalent organic group represented by Chemical Formula 11 or Chemical Formula 12:

Chemical Formula 11

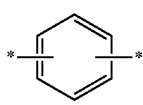

Chemical Formula 12

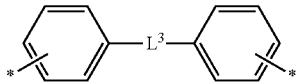

wherein, in the Chemical Formula 12,
$L^3$ is a single bond, —O—, —SO$_2$—, or —CR$^{16}$R$^{17}$—, wherein $R^{16}$ and $R^{17}$ are each independently hydrogen or a $C_{1-10}$ alkyl.

4. The copolymer for a liquid crystal alignment agent according to claim 1, wherein in the Chemical Formula 9, one of $A^2$ to $A^5$ is nitrogen and the rest are carbon.

5. The copolymer for a liquid crystal alignment agent according to claim 1, wherein in the Chemical Formula 9, one of $A^2$ and $A^5$ is nitrogen and the other is carbon, and $A^3$ and $A^4$ are carbon.

6. The copolymer for a liquid crystal alignment agent according to claim 1, wherein in the Chemical Formula 9, $A^1$ is oxygen.

7. The copolymer for a liquid crystal alignment agent according to claim 1, wherein the Chemical Formula 9 includes one or more repeating units selected from the group of Chemical Formula 9-1, Chemical Formula 9-2, and Chemical Formula 9-3:

Chemical Formula 9-1

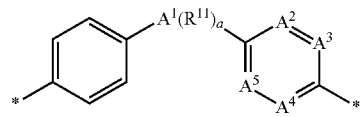

Chemical Formula 9-2

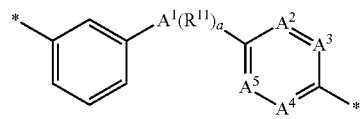

Chemical Formula 9-3

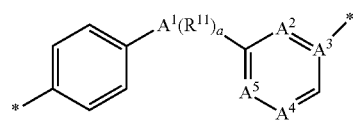

wherein, in the Chemical Formulae 9-1 to 9-3,
$A^1$ to $A^5$, $R^{11}$, and a are as defined in claim 1.

8. The copolymer for a liquid crystal alignment agent according to claim 1, comprising one or more repeating units selected from the group of repeating units represented by Chemical Formulae 13 to 21:

Chemical Formula 13

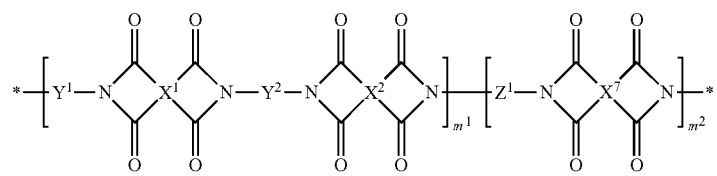

Chemical Formula 14
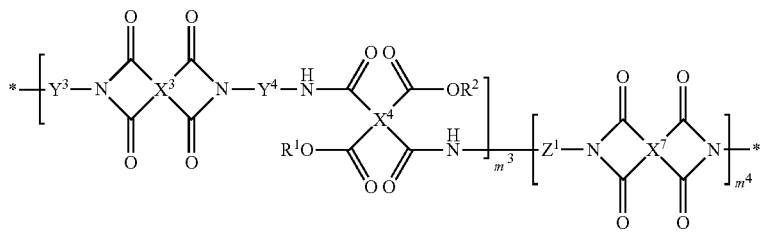
Chemical Formula 15
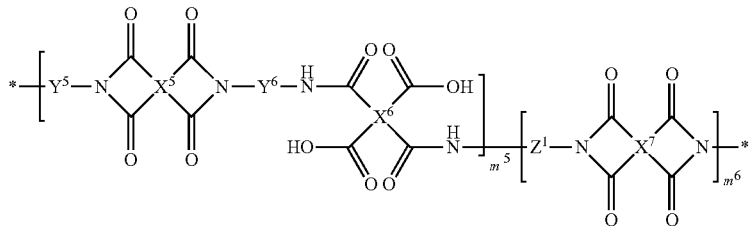
Chemical Formula 16
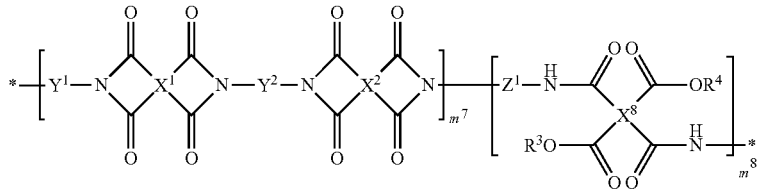
Chemical Formula 17
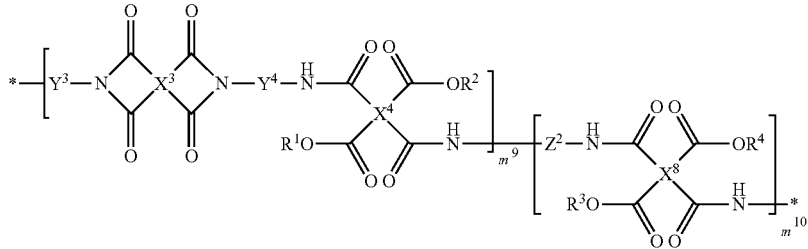
Chemical Formula 18
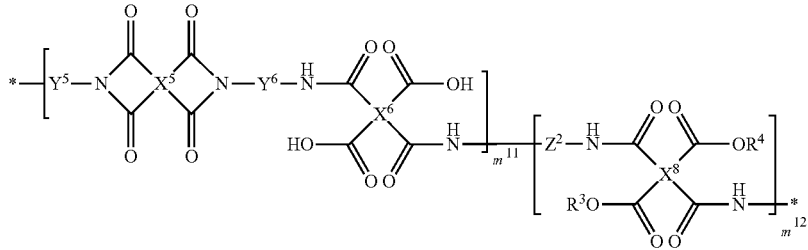
Chemical Formula 19
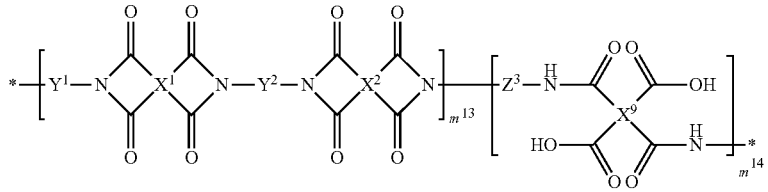

Chemical Formula 20

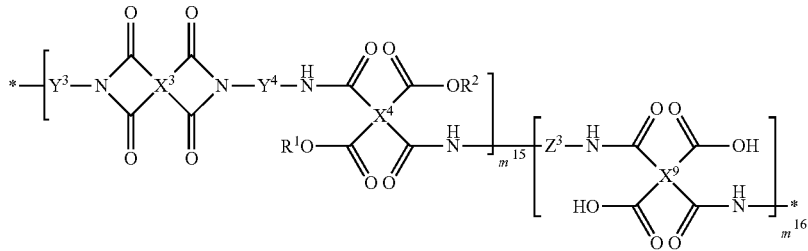

Chemical Formula 21

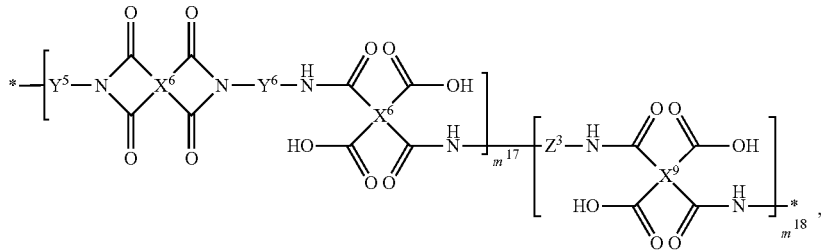

wherein, in the Chemical Formulae 13 to 21, $R^1$ to $R^4$, $X^1$ to $X^9$, $Y^1$ to $Y^6$, and $Z^1$ to $Z^3$ are as defined in claim 1, and $m^1$ to $m^{18}$ are each independently an integer of 1 to 500.

9. The copolymer for a liquid crystal alignment agent according to claim 1, wherein the copolymer for a liquid crystal alignment agent has a weight average molecular weight of 1000 g/mol to 200,000 g/mol.

10. A liquid crystal alignment agent comprising the copolymer for a liquid crystal alignment agent according to claim 1.

11. A method of producing a liquid crystal alignment film, the method comprising the steps of: coating the liquid crystal alignment agent of claim 10 onto a substrate to form a coating film; drying the coating film; irradiating the coating film with light or rubbing the coating film immediately after the drying step to perform an alignment treatment; and heat-treating and curing the alignment-treated coating film.

12. The method of producing a liquid crystal alignment film according to claim 11, wherein the liquid crystal alignment agent is dissolved or dispersed in an organic solvent.

13. The method of producing a liquid crystal alignment film according to claim 11, wherein the step of drying the coating film is performed at 50° C. to 150° C.

14. The method of producing a liquid crystal alignment film according to claim 11, wherein in the alignment treatment step, the light irradiation is performed by irradiating polarized ultraviolet rays having a wavelength of 150 nm to 450 nm.

15. The method of producing a liquid crystal alignment film according to claim 11, wherein in the step of heat-treating and curing the coating film, the heat treatment temperature is 150° C. to 300° C.

16. A liquid crystal alignment film produced by the method of claim 11.

17. A liquid crystal display device comprising the liquid crystal alignment film according to claim 16.

* * * * *